May 22, 1956 — F. K. H. NALLINGER — 2,746,766
SUSPENSION OF A RIGID AXLE, PARTICULARLY FOR MOTOR VEHICLES
Filed June 28, 1951
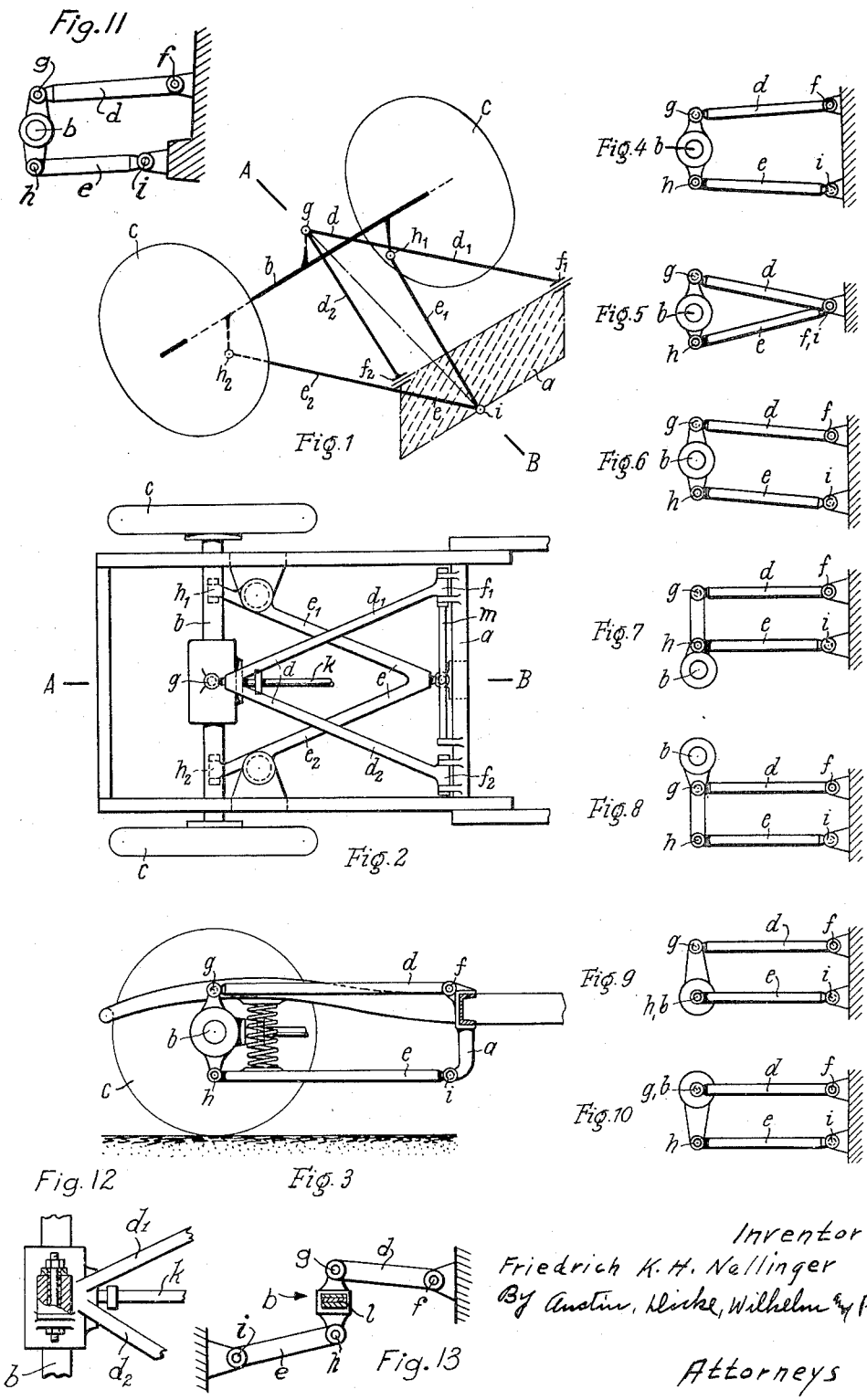
Inventor
Friedrich K. H. Nallinger
By Austin, Dicke, Wilhelm & Pedlow
Attorneys United States Patent Office 2,746,766
Patented May 22, 1956

2,746,766

SUSPENSION OF A RIGID AXLE, PARTICULARLY FOR MOTOR VEHICLES

Friedrich K. H. Nallinger, Stuttgart, Germany, assignor to Daimler-Benz Aktiengesellschaft, Stuttgart-Unterturkheim, Germany Application June 28, 1951, Serial No. 234,053

8 Claims. (Cl. 280—124)

This invention relates to a suspension of a rigid axle on the vehicle superstructure (body or frame).

An object of the invention is to provide primarily such a guiding of the axle as to the vehicle superstructure that an unobjectionable kinematic guiding of the axle is effected, particularly also in such cases in which springs, for example, coil springs are used which by themselves can contribute naught toward the guiding of the axle.

The hitherto usual suspensions are, in this respect, attended by certain constructional difficulties. The frequently usual transversal swinging arms—the one end of which, for example, is linked to the frame and the other end to the axle—produce, on the springing motions of the axle, transverse motions which, for example, cause body shaking.

A feature of the invention consists in the provision of a pair of link members arranged one above the other and adapted to swing up and down substantially within longitudinal planes. One member of the pair is swingably secured to the frame for rocking motion about a transverse axis only and is connected to the axle between the wheels thereof for a universal swinging motion or at least for a swinging motion about a transverse axis and about a longitudinal axis. The other link of said pair of links is swingably secured to the axle between the wheels thereof for rocking motion about a transverse axis only and is connected to the frame either for a universal swinging motion or at least for rocking motion about a transverse axis and a longitudinal axis.

According to another feature of the invention each of the links is formed by a V-shaped strut or triangular member, the apex thereof being pivotally connected to the rigid axle, or the frame respectively, by a universal joint or by a joint permitting of a motion about a longitudinal axis and about a transverse axis. In the present case, means may be provided for connecting one end of each link with the frame, or the axle, respectively, by means of a hinge or by ball-and-socket joints, and for connecting the other end of said link to the axle, or the frame respectively, by means of a ball-and-socket joint for a universal rocking motion.

In order to explain the invention further several embodiments thereof as applied to a rigid axle suspension will now be described by way of example, with reference to the accompanying diagrammatic drawings in which—

Fig. 1 is a diagrammatic perspective view illustrating an axle suspension embodying the features of the present invention, Fig. 2 is a top plan view of the axle suspension shown in Fig. 1, Fig. 3 is a side view of the same, Figs. 4–11 illustrate modified forms of the axle suspension in side view, Fig. 12 is a partial view of Fig. 2 illustrating a rubber joint, and Fig. 13 is a more or less diagrammatic plan view of an axle suspension in which the axle is flexible in itself and in which one link extends towards the front and the other link member towards the rear of the vehicle.

In the drawings like references indicate the same or similar parts.

In the forms of the invention illustrated in the drawings $a$ represents the frame, $b$ a rigid axle with the road wheels $c$ (for example, the driven rear wheels of a motor vehicle), $d$ the upper link member built up of struts $d_1$ and $d_2$, and $e$ the lower link member built up of struts $e_1$ and $e_2$. The upper link member is connected with one of the two vehicle parts to be relatively guided (on the drawing the frame) by means of a hinge $f$ formed by two joints $f_1$ and $f_2$ in such a manner that, as to this part, it can swing only about a transverse axis of the vehicle, whereas the joint $g$ for connecting the upper link member $d$ with the other vehicle part (in the drawing the rigid axle $b$) is so formed that the link member, as to this part, can swing universally, as well about a transverse axis as also about a longitudinal axis of the vehicle. In a corresponding manner the lower link member $e$ is articulated by means of a hinge $h$ formed by two joints $h_1$ and $h_2$ to the second of the hereinbefore mentioned parts (in the drawing, therefore, to the rigid axle $b$) about a transverse axis only, and universally to the first mentioned part (in the drawing, therefore, to the frame), about a transverse and a longitudinal axis, by means of a joint $i$. In this connection the joints $f_1$ and $f_2$ as well as the joints $h_1$ and $h_2$ can be formed in the simplest way as hinge or pin joints, and the joints $g$ and $i$ as ball-and-socket joints. Torsion bar springs can also be employed to great advantage which, for example, are arranged in the articulated shafts of the joints $f_1$, $f_2$. Such a torsion bar $m$ is shown in Fig. 2.

Referring now particularly to Fig. 1 it will be seen that owing to this axle suspension the rigid axle $b$ with the road wheels $c$ can swing relative to the frame $a$ about a longitudinal axis for effecting vertical springing movements permitting the wheels to conform to the inequalities of the road as well as to bank on curves. When, for example, both wheels $c$ pass at the same time over an obstruction extending across the road the axle $b$ performs a parallel movement as to the frame as it is guided in vertical direction by means of the link members $d$ and $e$ in the manner of a parallelogram type suspension. If, on the contrary both wheels are to perform opposite springing motions as to the frame as, for example, in the case in a curve the rigid axle $d$ can perform this movement thereby that it swings, as to the frame, about the axis A—B extending through the joints $g$, $i$ in longitudinal direction of the vehicle, as clearly shown in Fig. 1. In this case the upper link member $d$ with the joints $f_1$, $f_2$ can be considered as a part of the frame $a$, and the lower link member $e$ with the joints $h_1$, $h_2$ as a part of the rigid axle $b$. Both link members $d$ and $e$ can be arranged in any suitable manner. In the form of the invention Figs. 1 through 3 the link members are about equal in length and arranged parallel to each other, the upper link member $d$ being situated above the rigid axle and linked thereto by $g$, and the lower link member $e$ below the rigid axle and linked thereto by $h$.

In Figs. 4 and 5 the link members $d$ and $e$, as seen in side view, are arranged at an angle to each other; namely, as seen from the rigid axle, in Fig. 4 extending away from each other, and in Fig. 5 extending towards each other. In a border line case, as clearly shown in Fig 5, the joint $i$ and the hinge $f$ for the connections to the frame of the link members can be situated in alignment thus effecting particularly advantageous conditions as to space and assembly.

In the form of the invention illustrated in Fig. 6 the guide links are slanted upwards from the frame to the rigid axle in the normal condition of the vehicle, i. e., at normal load and not in motion. Provision may also be made for a corresponding reverse arrangement in which the joints $f$, $i$ (for the connections to the frame) are situated at a higher level than the joints g, h (for the connections to the rigid axle) as shown in Fig. 11. Under certain conditions an arrangement may be particularly advantageously employed in which the joint situated at the lower end of the upper link member and the joint situated at the upper end of the lower link member are formed by ball-and-socket joints so that the axis A—B is essentially horizontal, or slightly inclined slowly rising either toward the front or preferably toward the rear.

In the embodiment of the invention illustrated in Fig. 7 both link members d and e are arranged above the rigid axle b and connected thereto by means of joints g and h, whereas Fig. 8 illustrates a reversed arrangement with link members d and e arranged below the rigid axle b and linked thereto by means of joints g and h. In these cases it is suitable for the object in view that the one joint of the two joints g and h which is nearer to the rigid axle is formed as ball-and-socket joint, or universal joint, thereby permitting only smallest lateral relative motions between the road wheels and frame on opposite springing motions of the wheels.

Figs. 9 and 10 illustrate similar arrangements as Fig. 7 and 8 except that in the case of Fig. 9 the lower link member e, and in the case of Fig. 10 the upper link member d, is connected to the axle by means of a joint h or g respectively arranged coaxial with the wheel axis.

In all cases both guide links may be arranged at an angle to each other, or parallel, or horizontally, or inclined. They may be of equal lengths as shown in Figs. 2–10 or unequal lengths as shown in Fig. 11. In addition, the joints g and i may be formed, in all cases, either as simple ball-and-socket joints and the joints f and h as hinge joints. Instead of ball-and-socket joints there might be provided any other kind of universal joint, for example, also flexible joints such as rubber joints, as shown in Fig. 12.

The joints for mounting the guide links to the frame are generally located within the wheelbase of the vehicle, however, alternatively they may also be situated beyond this wheelbase. Eventually, the one link member may extend from the axle towards the front and the other link member extends from the axle towards the rear, as diagrammatically shown in Fig. 13.

The road wheels of the rigid axle suspended in accordance with the present invention may be undriven ( e. g. front wheels), or driven (e. g. rear wheels). Most desirably the axle is driven by means of a double-joint shaft k from the engine suspended in the frame, as indicated in Fig. 2.

In addition, the wheel axle having been denoted, for the sake of simplicity, as rigid axle need not be formed as fully rigid axle so as to be included within the scope of the instant invention, but may, eventually, be dispensed with and in place thereof an in itself flexible axle member connecting the road wheels may be provided, such as that shown at 1 in Fig. 13, or another axle aggregate capable of transmitting the wheel guiding forces.

The term "vehicle body" used in the claims is intended to cover both a chassis or the entire body including side walls and end walls.

What is claimed is:

1. In a vehicle, the combination comprising an axle, a pair of wheels mounted thereon, a vehicle body supported by said axle, a single pair of links mounted one above the other for guiding said axle up and down relatively to said body, a hinge securing one of said links to said axle for rocking motion about the hinge axis only, the latter extending parallel to said axle, means connecting the same link to said vehicle body for swinging motion about both a transverse axis and a longitudinal axis of said vehicle, a joint for connecting the other one of said links to said axle for a relative rocking motion about a longitudinal axis and about a transverse axis of said vehicle, and means for hinging said last mentioned link to said vehicle body for rocking motion about a transverse axis of said vehicle, said joint and said hinge axis being spaced from one another and located in a plane extending at an angle to either one of said links, said means and said joint being disposed in the vertical central plane of the vehicle.

2. In a vehicle, the combination comprising an axle, a pair of wheels mounted thereon, a vehicle body supported by said axle, two V-shaped links mounted one above the other in opposed and spaced relationship, the diverging arms of one link and the apex of the other link being swingably secured to said body, and joints connecting the apex of said one link and the diverging ends of said other link to said axle, said joints being located at the corners of a triangle, the plane of said triangle being disposed at an angle to either one of said links.

3. The combination claimed in claim 2 in which said V-shaped links are located in substantially parallel planes.

4. The combination claimed in claim 2 in which two of said joints are located below and the third one above the axis of said wheels.

5. The combination claimed in claim 2 in which helical springs are co-ordinated to said axle and said links and mounted to restrain relative up-and-down movement of said axle relative to said body.

6. In a vehicle, the combination comprising an axle, a pair of wheels mounted thereon, a vehicle body supported by said axle, a pair of V-shaped links mounted one above the other in opposed and spaced relationship, means for swingably securing the diverging arms of one link and the apex of the other link to said body, and joints connecting the apex of said one link and the diverging ends of said other link to said axle, said joints being located at the corners of a triangle, the plane of said triangle being disposed at an agle to either one of said links, said means and said joints including a universal joint securing said first mentioned apex to said body and another universal joint connecting said second mentioned apex to said axle.

7. In a vehicle, the combination comprising an axle, a pair of wheels mounted thereon, a vehicle body supported by said axle, a pair of V-shaped links mounted one above the other in opposed and spaced relationship, means for swingably securing the diverging arms of one link and the apex of the other link to said body, and joints connecting the apex of said one link and the diverging ends of said other link to said axle, said joints being located at the corners of a triangle, the plane of said triangle being disposed at an angle to either one of said links, the axis of said wheels being located at a level other than any level intersecting said triangle.

8. In a vehicle, the combination comprising an axle, a pair of wheels mounted thereon, a vehicle body supported by said axle, a pair of V-shaped links mounted one above the other in opposed and spaced relationship, means for swingably securing the diverging arms of one link and the apex of the other link to said body, and joints connecting the apex of said one link and the diverging ends of said other link to said axle, said joints being located at the corners of a triangle, the plane of said triangle being disposed at an angle to either one of said links, said means and said joints including a ball and socket securing said first mentioned apex to said body and another ball and socket connecting said second mentioned apex to said axle.

References Cited in the file of this patent

UNITED STATES PATENTS

| | | |
|---|---|---|
| 2,198,099 | White | Apr. 23, 1940 |
| 2,300,844 | Olley | Nov. 3, 1942 |
| 2,369,501 | Wagner et al. | Feb. 13, 1945 |
| 2,403,833 | Spangler | July 9, 1946 |

FOREIGN PATENTS

| | | |
|---|---|---|
| 671,298 | France | Dec. 11, 1929 |